UNITED STATES PATENT OFFICE.

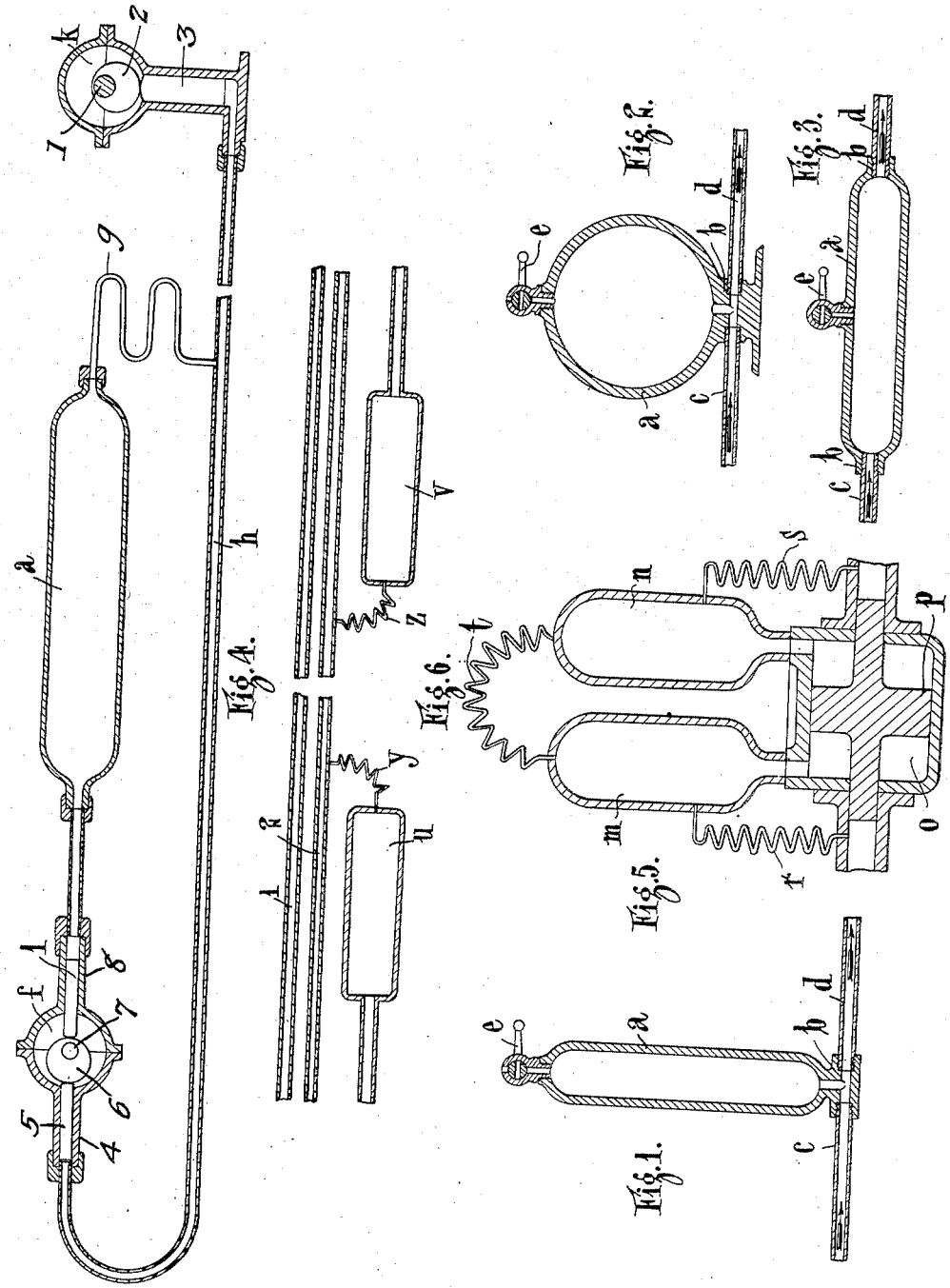

GOGU CONSTANTINESCO, OF LONDON, ENGLAND, ASSIGNOR OF ONE-HALF TO WALTER HADDON, OF LONDON, ENGLAND.

HYDRAULIC POWER TRANSMISSION.

1,334,283.

Specification of Letters Patent. Patented Mar. 23, 1920.

Application filed April 27, 1915. Serial No. 24,231.

*To all whom it may concern:*

Be it known that I, GOGU CONSTANTINESCO, a subject of the King of Roumania, and resident at "Underwood," 8, Lichfield Road, Kew Gardens, London, W., England, have invented certain new and useful Improvements in Hydraulic Power Transmission, of which the following is a specification.

The present invention relates to the hydraulic transmission of power.

In British Letters Patent Nos. 9029 of 1913 and 12438 of 1914, there is described a system for transmitting energy by means of pressure and volume variations produced in liquid columns, and in the said Letters Patent various devices are described for transmitting motion from a generator to a receiver or receivers.

The object of the present invention is to provide means by which several receivers can be operated by alternating movements of liquid produced by a single large generator, and further to provide for variable flow of liquid from a generator of constant displacement.

Referring to the accompanying drawings—

Figure 1 is a cross section of a capacity placed in connection with a pipe between the generator and receiver according to this invention;

Fig. 2 shows a modified form of capacity; while

Fig. 3 shows a further form.

Figs. 4, 5 and 6 show other applications of the invention.

According to the invention, the capacity may be of cylindrical form, as shown at Fig. 1. The capacity $a$ is formed of a strong metal cylinder, having a suitable connection $b$ at its base for the pipes $c$, $d$, connecting it to the generator and receiver or receivers. At the top of the vessel $a$ there is provided a cock $e$ for filling purposes and to allow the escape of air, so that the whole vessel can be completely filled with liquid. A similar arrangement is shown at Fig. 2, in which case the vessel $a$ is spherical instead of cylindrical. In the modification shown in Fig. 3, the cylindrical vessel is placed lengthwise along the pipe, instead of at right angles thereto, as in Fig. 1, suitable connections $b$, $b$, being provided for the pipes at the two ends of the cylinder.

The vessel $a$ may be of other suitable form, it being only necessary that it should be absolutely liquid-tight and completely filled with liquid, and placed in communication with a pipe line through which the pulsations of the liquid column are transmitted. The volume of the vessel will vary in accordance with the quantity of liquid required to enter and leave the vessel, in such a manner that taking into account the elasticity of the liquid and of the walls of the vessel, the pressure shall not rise to an unreasonable limit.

The operation of the apparatus is as follows:—

Suppose we have a piston reciprocating in a cylinder which communicates with a sufficiently large vessel completely closed, the vessel and the cylinder being kept full of liquid; if the displacement of the piston is relatively small in comparison with the volume of the vessel, even if there be no outlet of any kind, the liquid will simply be compressed to a certain degree, alternately passing through a maximum and minimum pressure. For example, if the ratio of the displacement of the piston to the volume of the recipient is 1/100, a reciprocating movement of the piston will have the effect of raising the pressure in the closed vessel, supposed full of water, to about 200 kilograms per square centimeter, when the piston is at the end of its outstroke, if the pressure was 1 kilogram per square centimeter when the piston is at the end of its instroke. Under such conditions, the vessel acts as a receiver for a flow of alternating current of liquid. If we connect the vessel with a pipe, we can then produce in this pipe alternating variations of pressure and volume in exactly the same manner as if the pipe were connected to the generator, that is, to the cylinder in which the piston is reciprocating, with the advantage that by the use of the closed vessel we are able to close the end of the pipe without the occurrence of excessive pressures.

Another advantage of the arrangement is that the end of the pipe can be connected to any type of apparatus for doing work. The alternating flow or current through the pipe will depend only on the displacement in the working apparatus, the displacement in the generator being greater and of a constant value.

It will be seen therefore that by means of this invention, a generator in which the displacement is constant can be used to work several receivers or working apparatus of variable displacement.

In the application of the invention shown in Fig. 4, power is transmitted from a monophase of the single cylinder pump or generator $k$ to a two-phase pump or receiver $f$. The shaft 1 of the generator carries an eccentric 2 driving a piston 3. This generator is connected by the pipe $h$ with the cylinder 4 of the receiver $f$ and the reciprocating motion of the liquid acting on the piston 5 causes this piston to exert an alternating pressure on the eccentric 6 on the shaft 7. A second piston $l$ in the cylinder 8 also acts on the eccentric, this cylinder being in communication with the capacity $a$ which is connected by a capillary pipe $g$ with the line $h$. If a suitable flywheel is provided on the shaft 7 by this means the generator $k$ will impart continuous rotation to the shaft 7 of the receiver $f$. A capacity $a$ of the type above described is used in order to dispense with a return pipe in the transmission of power by means of an alternating current of liquid. In this application of the invention, one of the ends of the cylinder $a$ forming the capacity is connected to a two-phase receiver $f$, the other end of the capacity being connected by a capillary tube $g$, or passage which would oppose great friction to the flow of liquid to the pipe $h$ connecting the receiver $f$ with a monophase generator $k$. In this apparatus the mean pressure in the cylinder $a$ will be substantially the same as the mean pressure in the pipe $h$, but the pulsations in the pipe will not materially affect the pressures produced in the capacity by the movement of the piston of the receiver which is connected to it. Under these conditions, the capacity $a$ will be subjected to variations of pressure, depending only on the displacement of the corresponding piston $l$ in the receiver, and will act in the same manner as a spring adjusting itself to the mean pressure in the pipe $h$. The liquid capacity can thus be used instead of steel springs in every case in which the recoil of a piston is required, giving the advantage of a very simple and reliable construction, and doing away with all difficulties arising from the use of metallic springs.

In the application of the invention shown in Fig. 5, two capacities, $m$, $n$, are used instead of steel springs in an ordinary condenser $o$, comprising a piston $p$ dividing the liquid column. Capillary tube connections $r$, $s$, $t$, are provided in this case also, to maintain the same mean pressures in the capacities and liquid columns.

In the application of the invention shown in Fig. 6, capacities $u$, $v$, are employed, in a three-phase system connecting a generator and receiver, the pipes 1 and 2 being continuous between the generator and receiver, while instead of a third pipe connecting the generator and receiver, short pipes are provided connecting the generator and receiver respectively to the two capacities $u$, $v$, these capacities being connected to a pipe 2 by capillary pipes $y$, $z$.

The liquid employed may be water, ether, paraffin or other liquids, and it will be seen that the liquid in the receiver may be a different liquid from that in the pipes, or in the generator or working apparatus.

Having now described my invention, what I claim as new and desire to secure by Letters Patent is:—

1. In apparatus for the transmission of power by alternating fluid currents, a generator, a receiver, a pipe between said generator and said receiver, a strong vessel communicating with said pipe, liquid completely filling said vessel, said liquid forming an elastic capacity, as and for the purposes described.

2. A system of transmitting energy by means of periodic variations of pressure and volume in a liquid column comprising: a pipe line containing a column of liquid, a generator for impressing energy on the liquid column by volume compression, work means connected to the pipe line to receive and utilize the energy impressed upon the liquid column, and means including a liquid capacity for preventing the building up of excessive pressure in the pipe line due to the work means absorbing less power than that impressed upon the liquid column by the generator.

In testimony whereof I have signed my name to this specification in the presence of two subscribing witnesses.

GOGU CONSTANTINESCO.

Witnesses:
RICHARD JAMES,
JAMES WILLIAMS.